(12) United States Patent
Sathananthan et al.

(10) Patent No.: US 8,457,225 B2
(45) Date of Patent: Jun. 4, 2013

(54) METHODS RELATING TO CHANNEL ESTIMATION

(75) Inventors: Satha Sathananthan, Victoria (AU); Kevin Lin, Victoria (AU); Thanh Bui, Victoria (AU); Dobrica Vasic, Victoria (AU)

(73) Assignee: NEC Corporation, Tokyo (JP)

( * ) Notice: Subject to any disclaimer, the term of this patent is extended or adjusted under 35 U.S.C. 154(b) by 721 days.

(21) Appl. No.: 12/452,617

(22) PCT Filed: Jul. 28, 2008

(86) PCT No.: PCT/JP2008/063498
§ 371 (c)(1),
(2), (4) Date: Jan. 12, 2010

(87) PCT Pub. No.: WO2009/017083
PCT Pub. Date: Feb. 5, 2009

(65) Prior Publication Data
US 2010/0136919 A1    Jun. 3, 2010

(30) Foreign Application Priority Data
Jul. 31, 2007 (AU) ................................. 2007904105

(51) Int. Cl.
*H04K 1/10* (2006.01)
(52) U.S. Cl.
USPC ........................................................ 375/260
(58) Field of Classification Search
USPC ........................................................ 375/260
See application file for complete search history.

(56) References Cited

U.S. PATENT DOCUMENTS

| 5,307,376 | A | 4/1994 | Castelain et al. |
| 7,583,739 | B2 | 9/2009 | Higuchi et al. |
| 2001/0055295 | A1 | 12/2001 | Akiyama et al. |
| 2005/0105647 | A1 | 5/2005 | Wilhelmsson et al. |
| 2006/0221808 | A1 | 10/2006 | Shirakata et al. |
| 2008/0219360 | A1* | 9/2008 | Hekmann et al. ............. 375/260 |
| 2008/0267320 | A1 | 10/2008 | Dateki |

FOREIGN PATENT DOCUMENTS

| JP | 5-75568 | 3/1993 |
| JP | 2002-9728 | 1/2002 |
| JP | 2004-241804 | 8/2004 |
| JP | 2004-266814 | 9/2004 |
| JP | 2004-282613 | 10/2004 |
| JP | 2005-286636 | 10/2005 |

(Continued)

OTHER PUBLICATIONS

Athaudage, C.R.N. et al., "Low-complexity channel estimation for wireless OFDM systems", Personal, Indoor and Mobile Radio Communications, 2003. PIMRC 2003. 14th IEEE Proceedings on, vol. 1, Sep. 2003, pp. 521-525.

(Continued)

*Primary Examiner* — Kevin Kim
(74) *Attorney, Agent, or Firm* — McGinn IP Law Group, PLLC

(57) ABSTRACT

The present invention relates to methods that can be used in a wireless communication system, and systems adapted to use such methods. In a preferred form the methods are useful in channel estimation in a wireless communication system using orthogonal frequency division multiplexing (OFDM). The system is provided with a control block to optimize channel estimation.

20 Claims, 5 Drawing Sheets

FOREIGN PATENT DOCUMENTS

| | | |
|---|---|---|
| JP | 2005-328312 A | 11/2005 |
| JP | 2006-314088 | 11/2006 |
| JP | 2007-104574 | 4/2007 |
| JP | 2007-511942 | 5/2007 |
| JP | 2008-199612 | 8/2008 |
| WO | WO 2007/077608 | 7/2007 |
| WO | WO 2008/023680 A1 | 2/2008 |

OTHER PUBLICATIONS

Japanese Office Action dated Jul. 23, 2012, with English transition.

Athaudage, C.R.N. et al., "Low-complexity channel estimation for wireless OFDM systems", Personal, Indoor and Mobile Radio Communications, 2003. PIMRC 2003. 14th IEEE Proceedings on, vol. 1, Sep. 2003, pp. 521-525 (previously submitted on Jan. 12, 2010).

* cited by examiner

P=4

FFT output

Interpolated sub-carriers

P=2

FFT output

Interpolated sub-carriers

P=8

FFT output

Interpolated sub-carriers

METHODS RELATING TO CHANNEL ESTIMATION

FIELD OF THE INVENTION

The present invention relates to methods that can be used in a wireless communication system, and systems adapted to use such methods. In a preferred form the methods are useful in channel estimation in a wireless communication system using orthogonal frequency division multiplexing (OFDM).

BACKGROUND OF THE INVENTION

It will be convenient to describe the preferred embodiments of the invention using terminology consistent with that used by the 3rd Generation Partnership Project (3GPP). However, the present invention should not be considered as being limited to use in networks complying with 3GPP Standards.

The applicant does not concede that the prior art discussed herein forms part of the common general knowledge in the art at the priority date of the present application.

Throughout the present specification the following abbreviations and acronyms will be used.

| | |
|---|---|
| RS | Reference Signal |
| CE | Channel Estimation |
| RE | Resource Element |
| CIR | Channel Impulse Response |
| VCIR | Virtual CIR |
| CFR | Channel Frequency Response |
| VCFR | Virtual CFR |
| TF | Time Frequency |
| CP | Cyclic Prefix |
| ABS | Absolute Value |
| FH | Frequency Hopping of RS |
| UE | User Equipment |
| LTE | Long Term Evolution of 3GPP networks |

In OFDM system, pilot symbol or RS are inserted into the time frequency (TF) grid in a transmitted signal so that UE can estimate the channel for all RE carrying data. To keep the overhead relating to RS small, RS RE are spaced in time and frequency as shown in FIG. 1 below.

In FIG. 1:
There are 7 OFDM symbols in one slot in time direction
There are 17 sub-carriers in frequency direction
1st and 5th OFDM symbols in a slot carry RS
Diagonally hatched and cross hatched RE contains RS
RS spacing in the frequency domain is 6.

There exist various way of completing the CE for the rest of the RE. In a typical method, the following steps can be followed:

UE first obtains CE for every sub-carrier in the OFDM symbol where RS is transmitted, e.g. the 1st and 5th OFMD symbol in a slot in this example; (see block M1 to M6 below).

Then UE uses time interpolation to obtain CE for every sub-carrier in the OFDM symbol where RS is not transmitted, e.g. 2nd, 3rd, 4th, 6th, 7th OFDM symbol in a slot in this example (see block M7 below).

The basic system for performing CE in a UE is illustrated in FIG. 2. Its operation will now be briefly described:

In this discussion let Nrs denote the number of RS RE in one OFDM symbol

Block M1—uses Nrs RS REs to generate a vector of tentative estimates, the Length of the vector Nls=Nrs.

Block M2—generates vector of VCFR of size N which is the smallest power of 2 that is larger Nis, using the vector from block M1 as an input. The simplest way is to add (N-Nls) zeros to the end of the input vector.

Block M3—performs an N point IFFT

Block M4—performs de-noising of the time domain signal i.e. zeroing all samples which have magnitude smaller than a preset de-noise threshold.

Block M5—performs an N points FFT

Block M6—performs frequency interpolation between RS RE to obtain CE for all sub-carriers (6Nrs) in the OFDM symbol.

Block M7—performs time interpolation to obtain CE for all sub-carriers in the OFDM symbol not carrying RS However using such a system it may not be possible to obtain accurate CE in different channel conditions, mainly defined by Doppler, Delay spread, and Noise level.

SUMMARY OF THE INVENTION

In a first aspect the present invention provides a method in a device of a wireless communications system configured to receive a signal including a plurality of signal positions able to be defined by a time position and sub-carrier frequency, the method including: receiving a signal including a first number of reference signals; generating a second number of tentative channel estimates on the basis of the first number of reference signals, wherein the second number of channel estimates are greater than the first number of reference signals received.

The method can include: generating channel estimates for the received reference signals and estimating tentative channel estimates for one or more signal positions between said received reference signals by interpolating between two or more neighbouring reference signals.

The interpolation can preferably be selected from linear or LMMSE interpolation.

The interpolation can be performed between pairs of neighbouring reference signals in either a time or frequency dimension.

One or more of the number of tentative channel estimates, and the type of interpolation to use for generating can be determined on the basis of a signal parameter or condition.

The interpolated value in respect a signal position can be based on channel estimates for a plurality of signal positions either side of the said signal position.

The interpolated value in respect a signal position can be based on weighted values of channel estimates for a plurality of signal positions either side of the said signal position.

In a second aspect the present invention provides a method in a device of a wireless communications system configured to receive a signal including a plurality of signal positions able to be defined by a time position and sub-carrier frequency, the method including: creating a first vector corresponding to channel estimates for a plurality of signal positions; creating a second vector of channel estimates for an increased plurality of signal positions by: determining a value of X additional signal positions following on from the first vector by extrapolation on the basis of a plurality of channel estimates from one end of the first vector; determining a value of Y additional signal positions spaced apart from the X additional signal positions on the basis of a plurality of channel estimates from the other end of the first vector.

The method can further include: interpolating between the X and Y additional signal positions to populate at least some of the signal positions in the vector between them.

The extrapolation can be selected from either linear or LMMSE extrapolation.

The signal positions between the X and Y additional signal positions not populated by interpolation can be filled with zeros.

The parameters of any one of the extrapolation or interpolation can be determined on the basis of a signal parameter or condition.

The second vector preferably has a length equal to the next power of two higher than the length of the first vector.

In a third aspect the present invention provides a method in a device of a wireless communications system configured to receive a signal including a plurality of signal positions able to be defined by a time position and sub-carrier frequency, the method including: receiving a time domain signal including $2^n$ time domain samples representative of channel estimates of a plurality of signal positions in the signal; de-noising the time domain signal using one or more of the following methods: replacing all samples below a threshold value with a predetermined value; applying one or more windows to the signal, and replacing all samples outside the window with a predetermined value; applying one or more windows to the signal and processing the samples outside the windows in accordance with a second de-noising algorithm.

The parameters of the one or more windows can be determined on the basis of either: a delay spread of the signal; or a position of one or more peaks detected in the time domain signal.

The position of a peak in the time domain signal can be detected by: up-sampling the time domain signal; and applying a filter to enhance a suspected peak.

The predetermined value is preferably zero.

The threshold is preferably set adaptively.

The de-noising method selected, and or the parameters of the de-noising method selected can be determined on the basis of a signal parameter or condition.

In a fourth aspect the present invention provides a method in a device of a wireless communications system configured to receive a signal including a plurality of signal positions able to be defined by a time position and sub-carrier frequency, the method including: receiving a time domain signal representing pre-processed CE data in respect of the signal; conducting a FFT to generate a plurality of frequency domain CE values; post processing the frequency domain CE values to allocate a plurality of CE values to a plurality of signal positions in the signal.

The post processing can include: interpolating between two or more CE values output by the FFT to determine CE values for at least one signal position between signal positions known to correspond to output CE values of the FFT.

The interpolation can be preferably linear or LMMSE.

The time domain signal is preferably been pre-processed by adding zeros between predetermined signal positions.

The post processing can further include, extrapolating on the basis of the CE of at least two known signal positions to determine a CE for a signal position at the edge of a band.

Preferably LMMSE extrapolation is used.

Preferably at least one parameter of the method selected can be determined on the basis of a signal parameter or condition.

In a fifth aspect the present invention provides a method in a device of a wireless communications system configured to receive a signal including a plurality of signal positions able to be defined by a time position and sub-carrier frequency, the method including: obtaining CE for all sub-carriers in a first time position; obtaining CE for all sub-carriers in a second time position; and extrapolating between the obtained CE values for a frequency sub-carrier to obtain CE values for intermediate signal positions.

The interpolation can be either one of linear or LMMSE interpolation.

The method can further include selecting between either linear or LMMSE interpolation on the basis of at least one signal parameter or condition.

In the above aspects of the invention the signal parameter or conditions on which control of the method is based can include:
signal delay spread;
signal Doppler frequency;
signal to noise ratio;
CP length.

In a sixth aspect the present invention provides a method of channel estimation for use in a system configured to receive a signal including a plurality of signal positions able to be defined by a time position and sub-carrier frequency, the method including: generating an initial set of a first number of tentative channel estimates in respect of a plurality of signal positions; generating a vector of channel estimates including Nls channel estimates, where Nls is the greater than the first number of tentative channel estimates; converting the vector into a time domain signal; de-noising the time domain signal; processing the de-noised signal to generate a frequency domain signals representing a plurality of CE values not equal to the first number of tentative channel estimates; interpolating between at least some of the CE values to determine CE values for a plurality of signal positions.

The step of generating an initial set of a first number of tentative channel estimates is preferably performed in accordance with an embodiment of an aspect of the present invention.

The step of generating a vector of channel estimates is preferably performed in accordance with an embodiment of an aspect of the present invention.

The step of de-noising the time domain signal is preferably performed in accordance with an embodiment of an aspect of the present invention.

The step of processing the de-noised signal to generate a frequency domain signal is preferably performed in accordance with an embodiment of an aspect of the present invention.

The step of interpolating between at least some of the CE values is preferably performed in accordance with an embodiment of an aspect of the present invention.

In the above embodiments the signal is preferably an OFDM signal.

In a seventh aspect the present invention provides a system for use in a mobile terminal of a telecommunications network including at least one processing block configured to perform a method according to an aspect of the present invention.

Preferably the system includes a plurality of processing blocks configured to perform a plurality of methods according to an aspect of the present invention.

The system can further include a control means configured to control at least one of said processing blocks on the basis of a signal parameter or transmission condition.

The control means is preferably configured to control at least one of said processing blocks on the basis of one or more of the following: signal delay spread; signal Doppler frequency; signal to noise ratio; CP length.

The control means is preferably adapted to control the one or more processing blocks in accordance with Table 1.

Preferably the system is configured to receive an OFDM signal.

In a further aspect the present invention provides a mobile terminal including a system made in accordance with an embodiment of one of the above mentioned aspects of the invention.

BRIEF DESCRIPTION OF THE DRAWINGS

Illustrative embodiments of the present invention will now be described, by way of non-limiting example only, with reference to the accompanying drawings, in which.

DETAILED DESCRIPTION OF THE EMBODIMENTS

Figure 3:
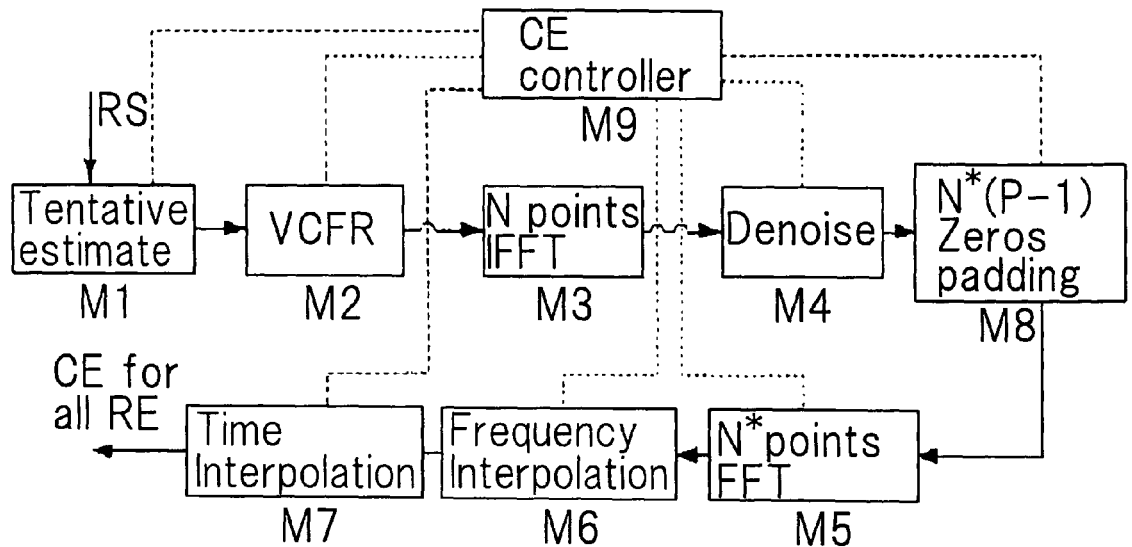
FIG. 3 is a schematic block diagram illustrating a system for channel estimation system in a device operating in a wireless communication system, operating in accordance with an embodiment of the present invention.

FIG. 3 is a schematic block diagram illustrating a system for channel estimation system in a device operating in a wireless communication system, operating in accordance with an embodiment of the present invention.

Figure 2:
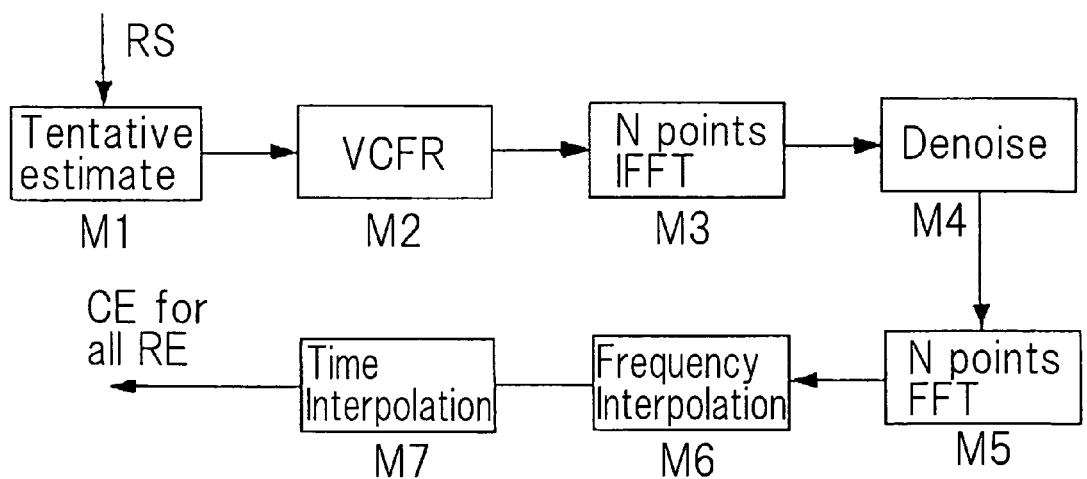
FIG. 2 is a schematic block diagram illustrating a conventional channel estimation system in a device operating in a wireless communication system.

One difference between the system of FIG. 3 and that of FIG. 2 is the use of block M9 which performs a function of controlling the operation of blocks M1, M2, M4, M5, . . . , M8 to optimize CE performance in different channel conditions. Other differences will also become apparent on reading the following description.

Figure 1:
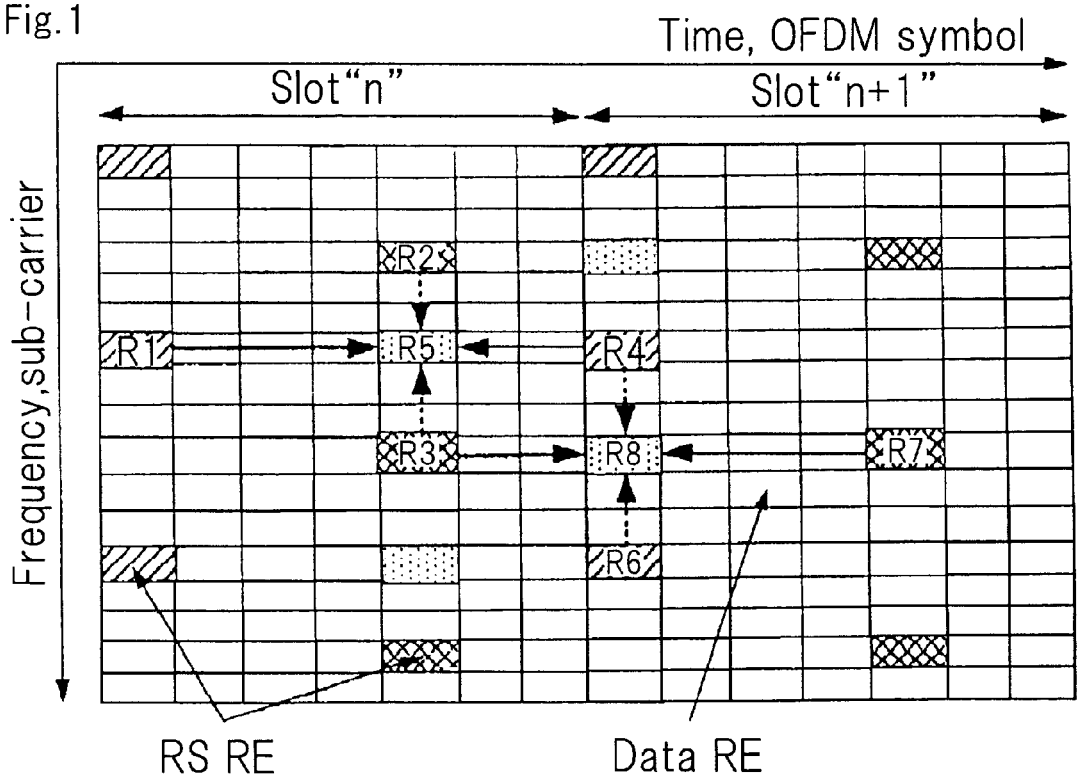
FIG. 1 shows a Time-Frequency (TF) grid illustrating the arrangement of RS RE over a two slots in an OFDM system.

The function of each of the blocks of the system will now be explained by with reference to an exemplary situation. Consider 10 MHz OFDM system with normal CP. In the context of FIG. 1, there will be 600 sub-carriers in frequency direction and there will be Nrs=100 RS RE in one OFDM symbol.

Block M1—Generates a vector of Nls=Nrs=100 or Nls=2Nrs=200 tentative estimates, depending on the parameters set by Block M9.

If Nls=100, 100 tentative estimates are generated as in the conventional approach.

If Nls=200, FIG. 1 illustrates how the additional 100 tentative estimates (in addition to above 100) are generated. In this figure the RE shaded with dots are the additional "tentative estimates" and are generated by interpolation in either the time direction, e.g. R5=$f_t$(R1 and R4) and R8=$f_t$(R3 and R7), or in the frequency direction, e.g. R5=$f_f$(R2 and R3); R8=$f_f$(R4 and R6) in certain embodiments of the present invention. Functions $f_t$ and $f_f$ can be simple linear or LMMSE interpolation.

This block can operate as follows under control of Block M9:
  Nls=100 should be used when:
    No RS in previous/next OFDM symbol are available; or
    The channel has High Doppler and large delay spread.
  Nls=200 should be used otherwise.
  $f_t$ should be used in low Doppler, and $f_f$ should be used in high Doppler and small delay spread
  In case of low Doppler and low SNR, RS from more than one previous OFDM can be used (e.g. using a weighted average) to obtain tentative estimate for current OFDM symbol to improve CE performance.

Figure 4:
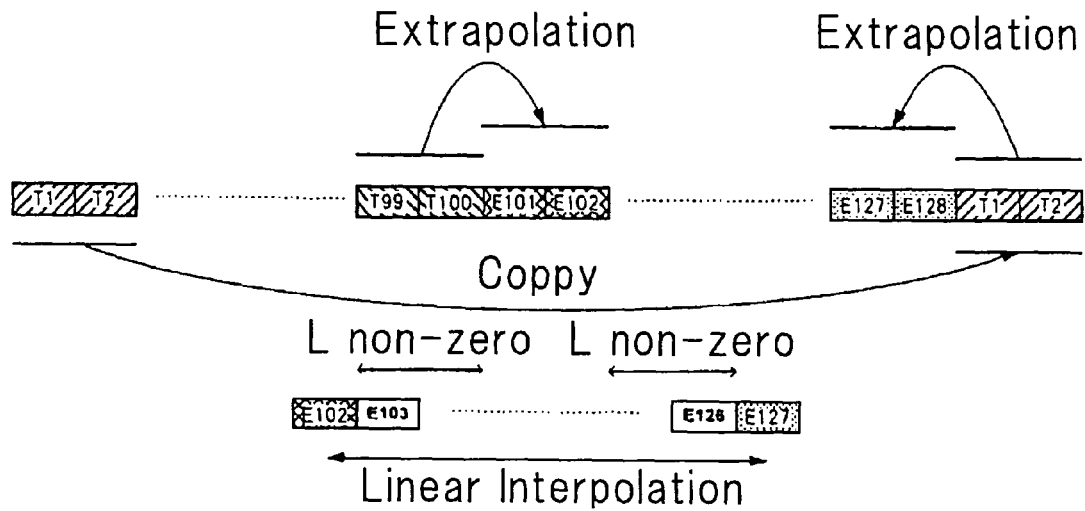
FIG. 4 illustrates a method of interpolation performed while determining VCFR in an embodiment of the present invention.

Block M2 This block generates a vector of N=128 or 256 depending on whether Nls=100 or 200 respectively. FIG. 4 illustrates an example of how this is performed for N=128.

T1,T2, . . . , T100 are input samples, i.e. tentative estimates,
E101 and E102 are extrapolated samples using T99 and T100
E127 and E128 are extrapolated samples using T1 and T2
Extrapolation to get E101, E102, E127 and E128 can be linear or LMMSE.
E103 to E126 are generated by linear interpolation between E102 and E127. Among those, only 2 L samples are kept, the remaining are set to zero. L is a parameter set by control block M9.

This block can operate as follows under control of Block M9:
  Linear Extrapolation should be used in low delay spread;
  LMMSE Extrapolation should be used in high delay spread;
  L should be set to 0 in low SNR.

Figure 5:
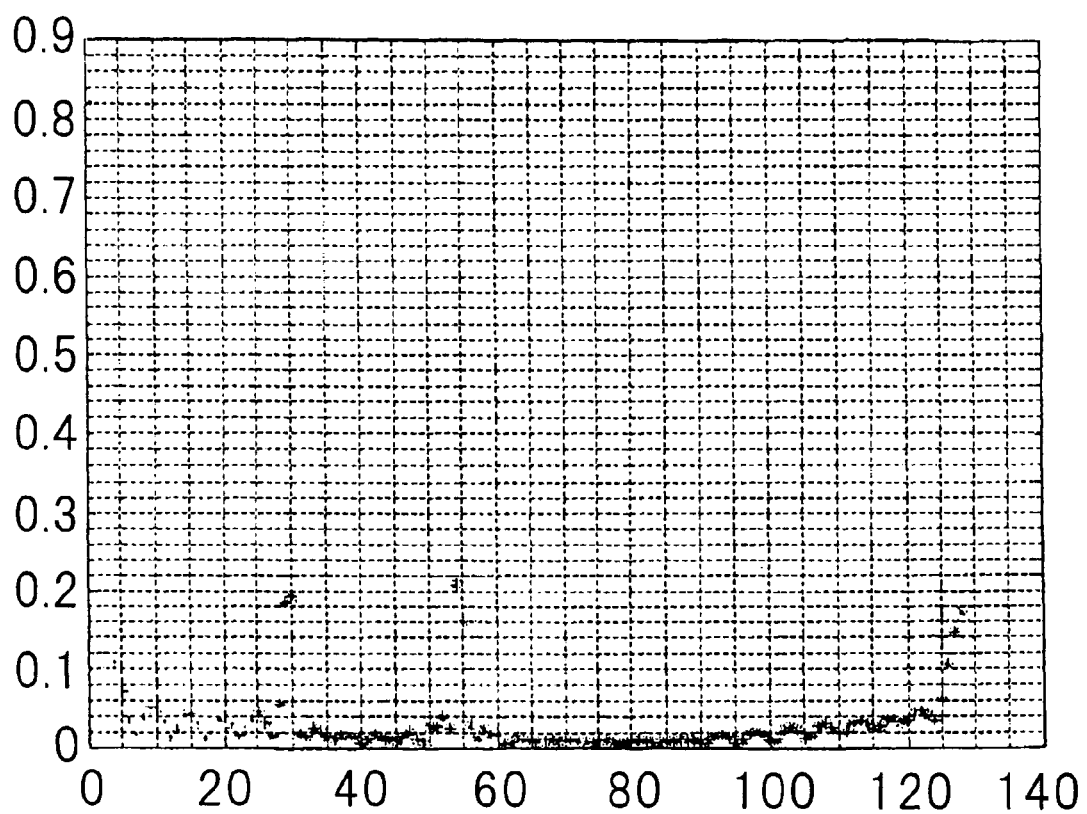
FIG. 5 illustrates an exemplary VCIR of a channel in an embodiment of the present invention.

Block M4 M4 performs de-noising of the VCIR. An exemplary VCIR is shown in FIG. 5. In this figure, N=128 (time domain), and there are 3 paths at positions 1, 30 and 54 where 2nd and 3rd paths are 10 dB below the 1st path.

Block M4 can be configured to perform three types of de-noising, preferably it is adapted to selectively perform one or more of the following combinations of de-noising on the basis of control input from block M9.

Type 1: The first type of de-noising able to be implemented in M4 is to set all samples in the VCIR to a chosen level, e.g. zero, which have magnitude below a threshold T. T can be chosen so that the three peaks and few surrounding samples are kept. In the present example T should be about 0.03, although other thresholds can be selected. Preferably the threshold T is able to be set dynamically on the basis of the SNR.

Type 2: The second type of de-noising able to be implemented in M4 is to zeros all samples in VCIR which are outside a window (W), regardless of their magnitude. In above figure, windows could be made cover samples from 1 to 60 and from 120 to 128. The length of the window can be selected based on the CP length of the OFDM signal. The samples within the window can be subject to further processing, e.g using the type 1 de-noising above.

Type 3: The third type of de-noising able to be implemented in M4 is to mask certain regions of the VCIR so that the samples within the mask windows are retained, irrespective of the level of these samples, when de-noising according to the Type1 process is performed outside the masked window.

The mask window is normally a small window centred at position of a detectable path. To detect the position of a path, especially a non-sample space path, the Y=ABS(VCIR) is up sampled by inserting 2 or 5 zeros between two consecutive samples, and then filtering by sinc filter or simple FIR filter. This can enhance the peak at position correspond to a path (particularly a non-sample space path) and thus its position can be detected more easily.

Samples in VCIR not correspond to paths can be used to estimate wideband noise variance.

In a preferred form the system is adapted to perform the following combinations of the above mentioned de-noising algorithms:
Type1 only;
Type2 and Type1;
Type3 and Type1; or
Type2 and Type3 and Type 1.

This block can operate as follows under control of Block M9:
The de-noising type 1, 2 or 3 can be used in different combinations:
T should be small/large for high/low SNR respectively;
A window (W) should be small/large for small/large delay spread respectively;
N should be large to better cancel inter sector interference.

Block M8 Block M8, has the function of inserting N(P−1) zeros to form a new VCIR of size N*P, where P is power of 2.

This block can operate as follows under control of Block M9:
When N=256, P can be 2 or 4 depending of trade off between performance and complexity desired. Note that P=2 means that a smaller FFT size in Block M5 can be used.
When N=128, P should be double that for the corresponding case of N=256.
P=1 is a special case when one wants to use linear or LMMSE interpolation to obtain CE for 2 (N=256) or 5 (N=128) sub-carriers in between two sub-carriers corresponding to the tentative estimates Block M5 M5 is an FFT block with a size corresponding to N*P.

Block M6 Block M6 performs an interpolation of the frequency domain outputs from the FFT stage to arrive at CE for each sub carrier. The interpolation is needed to compensate for the difference between the number of FFT points and the number of sub carriers.
When P>1
FIGS. 6A, 6B and 7 illustrate the interpolation of performed between the outputs of Block M5 (labelled FFT outputs) and the CE for each sub-carrier output from block M6 (labelled as interpolated cub-carriers) in various exemplary scenarios.

Figure 6A:
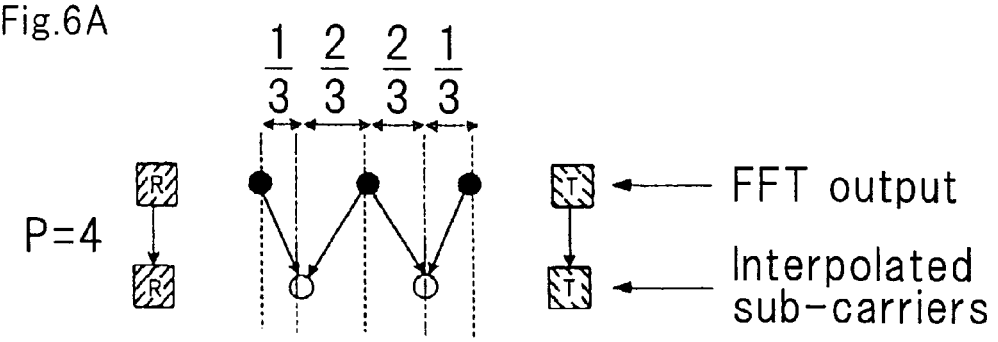
FIG. 6A illustrates a first example of frequency interpolation used in a system of the present invention, with parameters N=256, P=4 and spacing between tentative CE is 3.
Figure 6B:
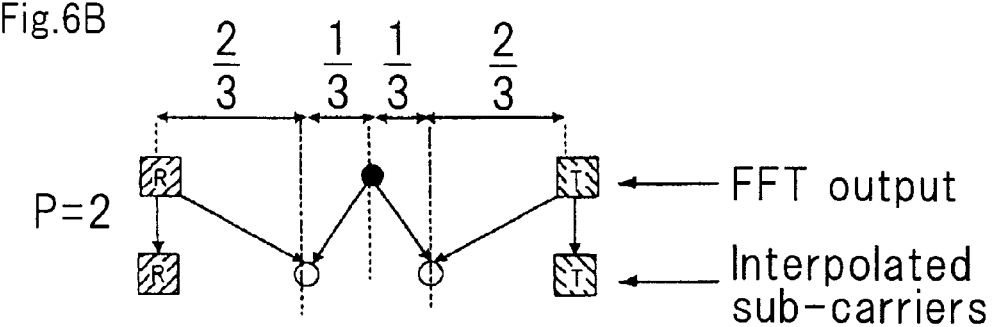
FIG. 6B illustrates a first example of frequency interpolation used in a system of the present invention, with parameters N=256, P=2 and spacing between tentative CE is 3.
Figure 7:
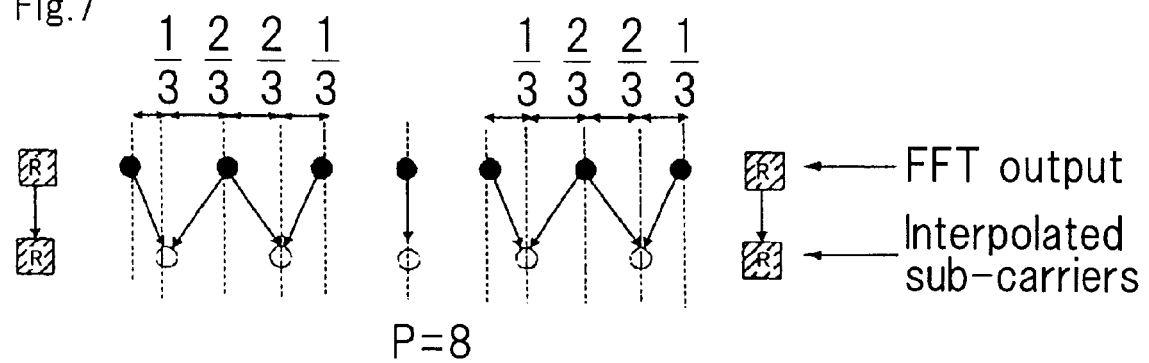
FIG. 7 illustrates a first example of frequency interpolation used in a system of the present invention, with parameters N=128, P=8 and spacing between tentative CE is 6.

In FIGS. 6A and 6B, N=256, spacing between tentative estimates is 3 and P=4 and 2 respectively. In FIG. 7 N=128, spacing between tentative estimates is 6, and P=8.

Linear interpolation between neighbouring CE points is performed as shown, with ⅓ and ⅔ linear weighting applied to a pair of FFT outputs to obtain CE for an interpolated sub-carrier.
When P=1
Linear or LMMSE interpolation can be used to obtain CE for 2 (N=256) or 5 (N=128) sub-carriers in between two sub-carriers corresponding to the tentative estimates.

Figure 8:
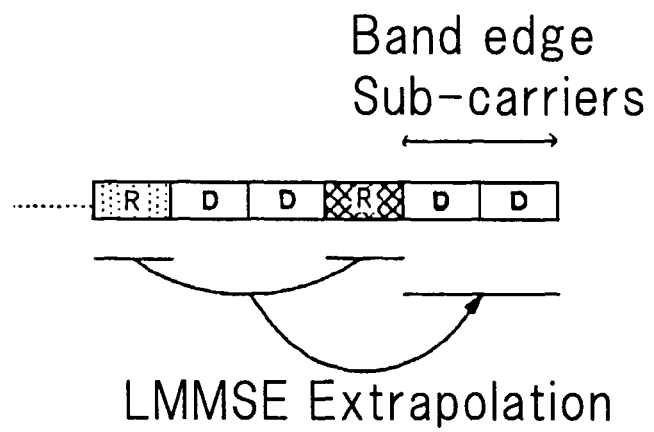
FIG. 8 illustrates an exemplary method of completing CE at a band edge in an embodiment of the present invention.
Figure 9:
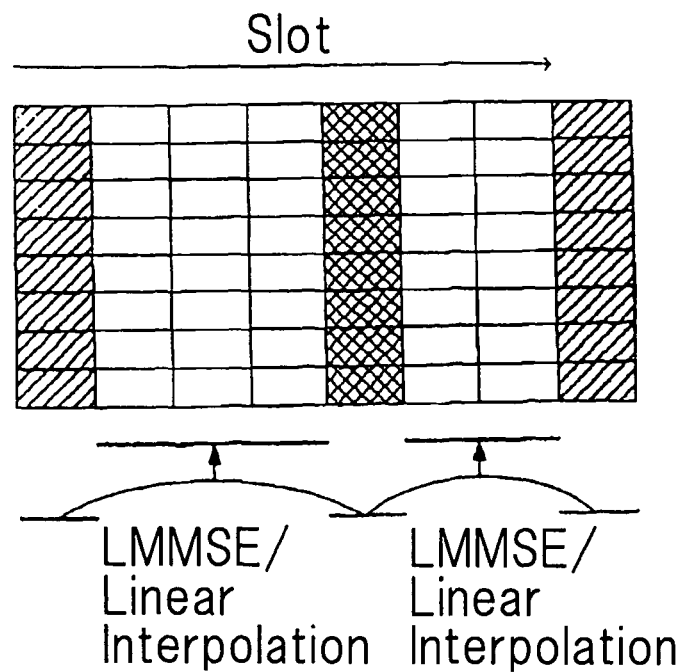
FIG. 9 illustrates an exemplary method of completing CE in the time direction in an embodiment of the present invention.

To improve CE for the sub-carriers at two ends of the band, (band edge) LMMSE extrapolation can be used in certain circumstances, e.g. in the manner shown in FIG. 8. In this example the CE for the nearest two RE RS are used to generate the CE of the band edge sub-carriers by LMMSE extrapolation.

This block can operate as follows under control of Block M9:
Use LMMSE extrapolation and interpolation only in case of large delay spread Block M7 Block M7 is responsible for controlling performing CE interpolation in the time direction. Interpolation can be linear or LMMSE.

This block can operate as follows under control of Block M9:
Use LMMSE interpolation in case of high Doppler
Use Linear interpolation in case of low Doppler Block M9 This block provides overall control and coordination for other blocks to optimize CE performance for different channel condition and constraints as mentioned above (such as availability of RS in previous/next OFDM symbols). Below is a summary example of a set of control parameters where RS in previous/next OFDM symbols are assumed available.

TABLE 1

|  |  | Low SNR | High SNR |
|---|---|---|---|
| Low Doppler | Small delay spread | Average LS estimate over A OFDM symbols (M1) Tentative spacing = 3 (M1) Linear extrapolation for band edge (M2) L = 0 (M2) High threshold for de-noise (M4) Linear interpolation (M7) | Average LS estimate over B < A OFDM symbols (M1) Tentative spacing = 3 (M1) Linear extrapolation for band edge (M2) L = L_def (M2) Low threshold for de-noise (M4) Linear interpolation (M7) |
|  | Large delay spread | Average LS estimate over A OFDM symbols (M1) Tentative spacing = 3 (M1) LMMSE extrapolation for band edge (M2) L = 0 (M2) High threshold for de-noise (M4) LMMSE extrapolation for band edge (M6) Linear interpolation (M7) | Average LS estimate over B < A OFDM symbols (M1) Tentative spacing = 3 (M1) LMMSE extrapolation for band edge (M2) L = L_def (M2) Low threshold for de-noise (M4) LMMSE extrapolation for band edge (M6) Linear interpolation (M7) |
| High Doppler | Small delay spread | No average (M1) Tentative spacing = 3 or 6 (M1) Linear extrapolation for band edge (M2) L = 0 (M2) High threshold for de-noise (M4) LMMSE interpolation (M7) | No average (M1) Tentative spacing = 3 or 6 (M1) Linear extrapolation for band edge (M2) L = L_def (M2) Low threshold for de-noise (M4) LMMSE interpolation (M7) |

TABLE 1-continued

| | Low SNR | High SNR |
|---|---|---|
| Large delay spread | No average (M1)<br>Tentative spacing = 3 or 6 (M1)<br>LMMSE extrapolation for band edge (M2)<br>L = 0 (M2)<br>High threshold for de-noise (M4)<br>LMMSE extrapolation for band edge (M6)<br>LMMSE interpolation (M7) | No average (M1)<br>Tentative spacing = 3 or 6 (M1)<br>LMMSE extrapolation for band edge (M2)<br>L = L_def (M2)<br>Low threshold for de-noise (M4)<br>LMMSE extrapolation for band edge (M6)<br>LMMSE interpolation (M7) |

Coefficients of LMMSE filters can be optimised for high Doppler or large delay spread.

Preferred forms of the various aspects of the present invention may confer the following advantages on the system:

The use of one stage FFT interpolation method provides significant performance gain for CE over the conventional linear interpolation method. For example, in TU6 channel at 30 dB SNR, the gain is about 5 dB. The complexity increase is moderate and can be optimized as there are many zeros at FFT interpolator input.

The use of simple linear/LMMSE extrapolation to obtain extra samples at the edge of VCFR enables receiver to achieve the peak throughput in high SNR condition. The complexity increase is negligible.

The use of simple linear interpolation in generating VCFR instead of complicated existing one provides comparable or even better performance.

By considering DC sub-carrier in actual RS spacing, slight improvement in CE can be achieved.

The use of simple LMMSE extrapolation to improve CE for band edge sub-carriers in large delay spread channel condition.

The use of simple LMMSE interpolation to improve CE for sub-carriers in OFDM symbols not carrying RS in high Doppler channel condition.

The use of sinc/FIR interpolation to improve the magnitude of non-sample space path can reduce the possibility that the path being removed during de-noising.

The use of CP windowing in VCIR improve CE performance.

The use of an adaptive de-noise threshold optimise CE performance in different conditions.

The use of VCIR for wide band noise variance estimation can improve the accuracy of the estimate.

The use of de-noise CE for Doppler estimation improve accuracy of the estimate.

The use of reduced RS spacing and FFT interpolation at high Doppler (and large delay spread) can improve CE performance.

The use of controller to control the use of different methods to optimize CE performance in various channel condition.

In case of low Doppler, no FH and low SNR, RS from current and more than one previous OFDM can be used (weighted average) to obtain tentative estimate for current OFDM symbol to improve CE performance.

In case of low Doppler, FH and low SNR, VCIR (before de-noise) from current and more than one previous OFDM can be used (weighted average) to obtain VCIR for current OFDM symbol to improve CE performance.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method in a device of a wireless communications system configured to receive a signal including a plurality of signal positions able to be defined by a time position and a sub-carrier frequency, the method including:
    receiving a signal including a first number of reference signals;
    generating a second number of tentative channel estimates on a basis of the first number of reference signals, wherein the second number of channel estimates are greater than the first number of reference signals received; and
    generating channel estimates for the received reference signals and estimating the tentative channel estimates for one or more signal positions between said received reference signals by an interpolating between two or more neighboring reference signals,
    wherein an interpolated value in respect to a signal position is based on channel estimates for a plurality of signal positions on either side of the signal position.

2. A method as claimed in claim 1, wherein the interpolation is selected from either a linear or a linear minimum mean square error (LMMSE) interpolation.

3. A method as claimed in claim 1, wherein the interpolation is performed between pairs of neighboring reference signals in either a time or a frequency dimension.

4. A method as claimed in claim 2, wherein one or more of the number of tentative channel estimates, and a type of interpolation to use for generating is determined on a basis of a signal parameter or condition.

5. A method as claimed in claim 1, wherein the interpolated value in respect to the signal position is based on weighted values of the channel estimates for the plurality of signal positions on said either side of the signal position.

6. A method in a device of a wireless communications system configured to receive a signal including a plurality of signal positions able to be defined by a time position and a sub-carrier frequency, the method including:
    creating a first vector corresponding to channel estimates for a plurality of signal positions; and
    creating a second vector of channel estimates for an increased plurality of signal positions by:
    determining a value of X additional signal positions following on from the first vector by an extrapolation on a basis of a plurality of channel estimates from one end of the first vector; and
    determining a value of Y additional signal positions spaced apart from the X additional signal positions on a basis of a plurality of channel estimates from another end of the first vector.

7. A method as claimed in claim 6, which further includes:
    interpolating between the X and Y additional signal positions to populate at least some of the signal positions in a vector between the X and Y additional signal positions.

8. A method as claimed in claim 6, wherein the extrapolation is selected from either a linear or a linear minimum mean square error (LMMSE) extrapolation.

9. A method as claimed in claim 6, wherein the interpolation is linear.

10. A method as claimed in claim 6, wherein the signal positions between the X and Y additional signal positions not populated by the interpolation are filled with zeros.

11. A method as claimed in any one of claim 6, wherein the parameters of any one of the extrapolation or the interpolation are determined on a basis of a signal parameter or condition.

12. A method as claimed in claim 6, wherein the second vector has a length equal to a next power of two higher than a length of the first vector.

13. A method in a device of a wireless communications system configured to receive a signal including a plurality of signal positions able to be defined by a time position and a sub-carrier frequency, the method including:
   receiving a time domain signal including $2^n$ time domain samples representative of channel estimates of a plurality of signal positions in the signal; and
   de-noising the time domain signal using one or more of following methods:
      replacing all samples below a threshold value with a predetermined value;
      applying one or more windows to the signal, and replacing all samples outside the windows with a predetermined value; and
      applying the one or more windows to the signal and processing the samples outside the windows in an accordance with a second de-noising algorithm.

14. A method as claimed in claim 13, wherein the parameters of the one or more windows are determined on a basis of either:
   a delay spread of the signal; or
   a position of one or more peaks detected in the time domain signal.

15. A method as claimed in claim 14, wherein the position of a peak in the time domain signal is detected by:
   up-sampling the time domain signal; and
   applying a filter to enhance a suspected peak.

16. A method as claimed in claim 13, wherein the predetermined value is zero.

17. A method as claimed in claim 13, wherein the threshold is set adaptively.

18. A method as claimed in claim 13, wherein the de-noising method selected and or the parameters of the de-noising method selected are determined on a basis of a signal parameter or condition.

19. A method as claimed in claim 1, wherein the interpolated value in respect to the signal position is based on channel estimates for the plurality of signal positions on both sides of the signal position.

20. A method as claimed in claim 1, wherein the interpolated value in respect to the signal position is based on weighted values of the channel estimates for the plurality of signal positions on both sides of the signal position.

* * * * *